United States Patent
Falzon et al.

(10) Patent No.: US 7,567,718 B2
(45) Date of Patent: Jul. 28, 2009

(54) DIGITAL IMAGE CONTEXT COMPRESSION

(75) Inventors: Frédéric Falzon, Pegomas (FR);
 Christophe Bernard, Paris (FR)

(73) Assignee: Alcatel, Paris (FR)

( * ) Notice: Subject to any disclaimer, the term of this patent is extended or adjusted under 35 U.S.C. 154(b) by 655 days.

(21) Appl. No.: 10/563,959

(22) PCT Filed: Jul. 7, 2004

(86) PCT No.: PCT/FR2004/001777

§ 371 (c)(1),
(2), (4) Date: Feb. 14, 2006

(87) PCT Pub. No.: WO2005/008886

PCT Pub. Date: Jan. 27, 2005

(65) Prior Publication Data

US 2006/0291733 A1    Dec. 28, 2006

(30) Foreign Application Priority Data

Jul. 11, 2003    (FR)    .................................. 03 08519

(51) Int. Cl.
 *G06K 9/36*    (2006.01)
(52) U.S. Cl. .................................................... 382/238
(58) Field of Classification Search ......... 382/232–233, 382/236, 238–239, 244–251; 348/384.1, 348/394.1–395.1, 398.1–404.1, 408.1, 430.1–431.1; 375/240.02, 240.11, 240.18–240.19; 708/317, 708/400–401
See application file for complete search history.

(56) References Cited

U.S. PATENT DOCUMENTS 5,867,602 A * 2/1999 Zandi et al. .................. 382/248

6,233,358 B1 * 5/2001 Acharya ...................... 382/248

FOREIGN PATENT DOCUMENTS

| EP | 0 914 004 A | 5/1999 |
| WO | WO 00/03347 A | 1/2000 |
| WO | WO 00/79802 A | 12/2000 |

OTHER PUBLICATIONS

C. Chrysafis et al, "Context-based adaptive image coding", Signals, Systems and Computers, 1996. Conference Record of the Thirtieth Asilomar Conference on Pacific Grove, CA, USA, Nov. 3-6, 1996, Los Alamisto, CA, USA, IEEE Comput. Soc., US<Nov. 3, 1996, pp. 1274-1278, XP010231352.

E. P. Simoncelli et al, "Embedded wavelet image compression based on a joint probability model", Image Processing, 1997. Proceedings, International Conference on Santa Barbara, CA, USA, Oct. 26-29, 1997, Lost Alamitoas, CA IEEE Comput Soc, US, Oct. 26, 1997, pp. 640-643, XP010254252.

* cited by examiner

*Primary Examiner*—Jose L Couso
(74) *Attorney, Agent, or Firm*—Patti, Hewitt & Arezina LLC (57) ABSTRACT

A device (D) for compressing digital image data by wavelet transform, the device including a processor (PM) having i) a module (M1) for transforming image data into wavelet coefficients distributed in sub-bands, ii) a module (M2) for estimating for each coefficient, first and second sets of prediction parameters, associated respectively with so-called north-south and west-east directions, based on values of wavelet coefficients of its north or south neighbors, iii) a module (M3) for quantifying the wavelet coefficients, and iv) an entropy coding module (M4) for determining for each coefficient prediction values of expectation and of the width of a Laplace function representing its probability density, based on the first and/or second sets of prediction parameters and on the wavelet coefficient quantified by its north neighbor or its west neighbor, and for entropy coding of the wavelet coefficients quantified via specific associated expectations and widths.

27 Claims, 1 Drawing Sheet

FIG_1

FIG_2

DIGITAL IMAGE CONTEXT COMPRESSION

The field of the invention is the use of wavelet transforms to compress/decompress digital image data.

Conventional wavelet transform coding codes an image in three steps. A first step decorrelates the image by transforming its pixels into wavelet coefficients distributed in sub-bands at several resolution levels. A second step quantifies the wavelet coefficients obtained in the first step. A third step entropically codes the wavelet coefficients quantified in the second step.

The person skilled in the art knows that this type of coding can be optimized only if three hypotheses are verified: the wavelet transform must be orthogonal, the wavelet coefficients must be coded using a zero order entropic code with no statistical interdependency of the coefficients, and the limits of "high-resolution quantifying", within which the probability densities of the wavelet coefficients vary little within a quantifying box, must be complied with.

If the above hypotheses are not verified, in theory complete bit rate assignment, by selecting a quantifying increment that is a priori different for each sub-band, is required. In practice, the coding remains qualitatively valid if the hypotheses are no longer formally verified. This is the case in particular if the wavelet transform is not orthogonal but bi-orthogonal or if the wavelet coefficients of the same sub-band are not coded independently because they are not independent.

Similarly, if the high-resolution quantifying hypothesis is not verified, the coder may be slightly modified by replacing its uniform quantifier with a central interval quantifier of twice the size (zero-centered quantifying interval or Dead Zone). This is because the distribution of the wavelet coefficients in each sub-band is a Laplace distribution (or a generalized Gaussian distribution) with a peak at 0 where it can no longer be reasonably considered as quasi-constant, especially at low bit rates (i.e. at high compression rates). A Laplace function is a special case of a generalized Gaussian function.

To attempt to improve coding under the conditions cited above (i.e. in the case of a bi-orthogonal transform or a transform not yielding independent coefficients), it has been proposed to exploit the interdependency of neighbor wavelet coefficients in the same sub-band by employing contextual entropic coding that takes into account a conditional probability density instead of a simple probability density. This conditional density models the law governing the appearance of a wavelet coefficient conditionally on its surroundings.

The term "intraband dependency" used hereinafter refers to a dependency between a coefficient $c_{j,k,k'}$ (or $W_{j,k}[n,m]$) and the neighbor coefficients of the same scale or sub-band $W_{jk}$, for example $c_{j,k-1,k'}$ and $c_{j,k,k'-1}$ or $c_{j,k-1,k'}$ and $c_{j,k-1,k'-1}$. These intraband dependencies are used in particular by coders that code positions of significant coefficients in "run-length" mode and by EBCOT/JPEG2000 coders.

Moreover, the term "interband dependency" used hereinafter refers to a dependency between a coefficient $c_{j,k,k'}$ and a coefficient at the same position on the higher scale, for example $c_{j+1,k/2,k'/2}$. These interband dependencies are used in particular by "zero tree" coders (as developed by Shapiro) and by the SPIHT coder (as developed by Said and Pearlman).

The above dependencies stem from the representation of each quantified wavelet coefficient $Q(c_{j,k,k'}'')$ in the form of a data string including its significant coefficient bit ($N_{j,k,k'}''=0$ or 1), and, if that bit has the value one (1), its sign ($S_{j,k,k'}''$, which has the value ±1) and its absolute value ($A_{j,k,k'}''$).

For example, zero tree coding exploits the statistical interdependency of the significant coefficient bits ($N_{j,k,k'}''$), whereas EBCOT coding exploits the statistical interdependency of the significant coefficient bits ($N_{j,k,k'}''$) and the inter-sign dependency $S_{j,k,k'}''$ of neighbor wavelet coefficients quantified with different increments.

The above contextual codes use particularly complex processing methods that require the coders to learn as many histograms as there are contexts, which significantly limits their rate of adaptation and prevents their use in the context of compression with a high input bit rate (large images) and in real time, in particular for remote sensing.

One object of the invention is therefore to improve upon the above situation.

To this end the invention proposes a wavelet transform method dedicated to compressing digital image data, comprising a step of transforming digital image data into wavelet coefficients divided into sub-bands, a step of quantifying said wavelet coefficients, and a step of entropically coding said quantified wavelet coefficients.

The method is characterized in that it comprises, between the transformation and quantifying steps, a step of estimating, for each coefficient of each sub-band of an image, first and second sets of prediction parameters respectively associated with "North-South" and "West-East" directions as a function of the values of the wavelet coefficients of its North and West neighbors, and, in the entropic coding step, there are determined for each coefficient of each sub-band of the image prediction values of the esperance and the width of a Laplace (or generalized Gaussian) function representing its probability density as a function of said first and/or second sets of prediction parameters and the quantified wavelet coefficient of its North neighbor or its West neighbor, and said quantified wavelet coefficients are coded entropically using the associated esperances and widths determined in this way.

Estimating the prediction parameters considerably simplifies the prediction phase of the entropic coding step, in which digital image data at high bit rates is compressed in real time, in particular for remote sensing.

The method of the invention may have other features and in particular, separately or in combination:

in the entropic coding step, when it is possible, North and West esperance prediction values and North and West width prediction values may be determined for the Laplace function of each quantified wavelet coefficient. The North (or West) esperance prediction value is then preferably defined by the product of a first prediction parameter of the first (or second) set and the value of the North (or West) neighbor quantified wavelet coefficient and the North (or West) width prediction value is defined by the sum of a second prediction parameter of the first (or second) set and the product of a third prediction parameter of the first (or second) set and the absolute value of the North (or West) neigbor quantified wavelength coefficient. In this case four situations must be envisaged, according to the environment of the wavelet coefficient concerned. In the absence of a North neighbor coefficient, the esperance and width prediction values of the Laplace function are made identical to the West esperance and West width prediction values. In the absence of a West neighbor coefficient, the esperance and width prediction values of the Laplace function are made identical to the North esperance and North width prediction values. In the absence of West and North neighbor coefficients, fixed Laplace coding is effected. Finally, in the presence of West and North neighbor coefficients, the esperance and width prediction values of the Laplace function are respectively made identical to the half-sum of the North and West esperance prediction values and to the half-sum of the North and West width prediction values, the prediction parameters of the first and second sets may be estimated by regression.

For example, the first prediction parameters of the first and second sets may estimated by a first regression obtained by solving an equation of the type W[n+1,m]=θ·W[n,m] where W[n,m] is the value of a wavelet coefficient and W[n+1,m] is the value of the neighbor wavelet coefficient of W[n,m], and θ is a first prediction parameter. For example, the first equation may be solved by the least squares method, the first prediction parameter of a first or second set then being equal to the ratio between the non-normalized covariance and variance of the values of the wavelet coefficients associated with the first or second set.

Similarly, the second and third prediction parameters of the first set may be estimated by a second regression obtained by solving a first system of equations of the type |W[n,m]−θN·W[n,m−1]|=αN+βN|W[n,m−1]|, where W[n,m] is the value of a wavelet coefficient, Wn,m−1 is the value of the North neighbor wavelet coefficient of Wn,m, and θN, αN and βN are respectively first, second and third prediction parameters of the first set, and the second and third prediction parameters of the second set may be estimated by a second regression obtained by solving a second system of equations of the type |W[n,m]−θw·W[n−1,m]|=αw+βw|W[n−1,m]|, where Wn−1,m is the value of the West neighbor wavelet coefficient of Wn,m and θw, αw and βw are respectively first, second and third prediction parameters of the second set. For example, the first and second systems of equations may be solved by the least squares method, a neighbor quantified wavelet coefficient of null value may be replaced by a product of the quantifying increment used during the quantifying step and a selected constant strictly greater than zero and less than or equal to one (1) and preferably equal to ⅓, in the entropic coding step, after determining the esperance and width prediction values, the Laplace function may be discretized. Alternatively, in the entropic coding step, iterative coding may follow determination of the esperance and width prediction values.

The invention also relates to a device for compressing digital image data by wavelet transformation, comprising processing means having a module for transforming digital image data it receives into wavelet coefficients distributed in sub-bands, a module for quantifying wavelet coefficients, and a module for entropically coding the quantified wavelet coefficients.

The device is characterized in that its processing means further comprise an estimator module adapted to estimate for each coefficient of each sub-band of the image first and second sets of prediction parameters respectively associated with "North-South" and "West-East" directions as a function of the values of the wavelet coefficients of its North and West neighbors and the entropic coder module is adapted to determine for each coefficient of each sub-band of the image prediction values of the esperance and the width of a Laplace (or generalized Gaussian) function representing its probability density as a function of the first and/or second set of prediction parameters and of the quantified wavelet coefficient of its North neighbor or its West neighbor and to code the quantified wavelet coefficients entropically using the determined associated esperances and widths.

The device of the invention may have other features and in particular, separately or in combination:

when it is possible, the entropic coder module may determine for the Laplace function of each quantified wavelet coefficient North and West esperance prediction values and North and West width prediction values. The North (or West) esperance prediction value is then preferably defined by the product of a first prediction parameter of the first (or second) set and the value of the North (or West) neighbor quantified wavelet coefficient, and the North (or West) width prediction value is defined by the sum of a second prediction parameter of the first (or second) set and the product of a third prediction parameter of the first (or second) set and the absolute value of the North (or West) neighbor quantified wavelet coefficient. In this case, the entropic coder module preferably processes four separate situations. In the absence of a North neighbor coefficient, it makes the esperance and width prediction values of the Laplace function identical to the West esperance and West width prediction values. In the absence of a West neighbor coefficient, it makes the esperance and width prediction values of the Laplace function equal to the North esperance and North width prediction values. In the absence of West and North neighbor coefficients, it effects fixed Laplace coding. Finally, in the presence of West and North neighbor coefficients, it makes the esperance and width prediction values of the Laplace function respectively equal to the half-sum of the North and West esperance prediction values and to the half-sum of the North and West width prediction values, its estimator module may estimate the prediction values of the first and second sets by regression.

For example, the estimator module may estimate the first prediction parameters of the first and second sets by a first regression obtained by solving a first equation of the type W[n+1,m]=θ·W[n,m], where W[n,m] is the value of a wavelet coefficient, W[n+1,m] is the value of the neighbor wavelet coefficient of W[n,m], and θ is a first prediction parameter. In this case, the estimator module may solve said first equation by the least squares method, for example. The first prediction parameter of a first or second set is then equal to the ratio between the non-normalized covariance and variance of the values of the wavelet coefficients associated with the first or second set.

Also, the estimator module may estimate the second and third prediction parameters of the first set by a second regression obtained by solving a first system of equations |W[n,m]−θ$_N$·W[n,m−1]|=α$_N$+β$_N$|W[n,m−1]|, where W[n,m] is the value of a wavelet coefficient, W$_{n,m-1}$ is the value of the North neighbor wavelet coefficient of W$_{n,m}$, and θ$_N$, α$_N$ and β$_N$ are respectively first, second and third prediction parameters of the first set, and estimate the second and third prediction parameters of the second set by a second regression obtained by solving a second system of equations |W[n,m]−θw·W[n−1,m]|=αw+βw|W[n−1,m]|, where W$_{n-1,m}$ is the value of the West neighbor wavelet coefficient of W$_{n,m}$, and θw, αw and βw are respectively first, second and third prediction parameters of the second set. In this case, the estimator module may solve the first and second systems of equations by the least squares method, for example, its entropic coding module, in the presence of a neighbor quantified wavelet coefficient of null value, may replace it by a product of the quantifying increment used by the quantifier module and a selected constant strictly greater than zero and less than or equal to one (1), and preferably equal to ⅓, after predicting the esperance and the width, its entropic coder module may discretize the Laplace function. Alternatively, after predicting the esperance and the width, the entropic coding module may proceed to iterative coding.

The invention further relates to a digital image data compressor/decompressor, or codec, comprising a compressor of the above type.

Other features and advantages of the invention will become apparent on reading the following detailed description and examining the appended drawings, in which.

The appended drawings constitute part of the description of the invention and may, if necessary, contribute to the definition of the invention.

An object of the invention is to enable the use of wavelet transforms to compress and decompress digital image data.

Conventional wavelet transform compression (or coding) decomposes an image I into sub-bands $W_{j,k}$ called LH, HL, HH and LL, and then transforms the digital image data I[n,m], which defines the intensity and the colour of the pixels of the image I, into wavelets, and more particularly into an array [n,m] of wavelet coefficients, and then quantifies the wavelet coefficients before coding them entropically.

Here, n and m are integers that vary within the limits of the image: n designates the column and is in the range $[0, n_{max}-1]$ and m designates the row and is in the range $[0, m_{max}-1]$. Thus a sub-band $W_{j,k}$ is defined by a two-dimensional array of wavelet coefficients $W_{j,k}[n,m]$ in which the indices n and m vary in sub-ranges $[0, n_{max}/2^j-1]$ and $[0, m_{max}/2^j-1]$. In this case $N=n_{max}$, $m_{max}$ is the number of pixels of the image I and $N_{j,k}=N/2^{2j}$ is the number of wavelet coefficients in a sub-band $W_{j,k}$.

The sub-bands are coded separately, the low-pass sub-band being coded with DPCM differential coding, and the resulting differences can be coded by a method similar to that used for a high-pass sub-band.

Moreover, $W_{j,k}[n,m-1]$ and $W_{j,k}[n-1,m]$ designate the "North" and "West" neighbors of a wavelet coefficient $W_{j,k}[n,m]$. To guarantee that a coefficient $W_{j,k}[n,m]$ will always be coded after its North and West neighbors, which are used to determine its value, the wavelet coefficients to be coded are processed in a particular order, namely in increasing lexicographical order over the pair (n,m).

Compression in accordance with the invention differs from conventional wavelet transform compression in particular in that it comprises, between its (conventional) transform step and its (conventional) quantifying step, a step in which, for each coefficient $W_{j,k}[n,m]$ of each sub-band $W_{j,k}$ of an image I, there are estimated first and second sets of prediction parameters, respectively associated with North-South and West-East directions, as a function of the values of the wavelet coefficients of its North neighbor $W_{j,k}[n,m-1]$ or West neighbor $W_{j,k}[n-1,m]$.

The first and second sets of prediction parameters are then used during the entropic coding step to determine for each wavelet coefficient $W_{j,k}[n,m]$ of each sub-band $W_{j,k}$ of the image I prediction values of the esperance (or mean) μ and the width σ of a Laplace function (or distribution) representing its probability density as a function of a (North or West) neighbor quantified wavelet coefficient:

$$p(c\mid c') = \frac{e^{-\left|\frac{x-\mu(c')}{\sigma(c')}\right|}}{2\sigma(c')}$$

where c represents a wavelet coefficient $W_{j,k}[n,m]$, c' represents either the North neighbor wavelet coefficient $W_{j,k}[n,m-1]$ of c or the West neighbor wavelet coefficient $W_{j,k}[n-1,m]$ of c, and μ(c') and σ(c') respectively represent the esperance and the width as a function of the neighbor wavelet coefficient c' concerned.

The esperance μ and the width σ of a Laplace distribution of density P are defined by the following equations:

$$\mu = \int xP(x)dx$$

$$\sigma = \int |x-\mu|P(x)dx$$

The various steps of the compression method of the invention are described in more detail next.

As indicated above, compression begins with a step in which the pixels of the image I are transformed into wavelet coefficients $W_{j,k}[n,m]$. The transformation step being entirely conventional, it will not be described here. For example, it may be implemented using the Daubechies/Antonini 7-9 bi-orthogonal wavelet transform, which is not strictly orthogonal but virtually orthogonal; this preserves the energy of the images to within a few percent.

At the end of this transformation step, all of the wavelet coefficients $W_{j,k}[n,m]$ of a given sub-band $W_{j,k}$ are therefore available.

The transformation step is followed by a step of estimating prediction parameters for each wavelet coefficient $W_{j,k}[n,m]$ of each sub-band $W_{j,k}$. Hereinafter, to simplify the notation, the indices j and k of the sub-bands will no longer be indicated. Consequently, W[n,m] designates a wavelet coefficient belonging to a sub-band $W_{j,k}[n,m]$, whether that is a LH, HH, HL or LL sub-band (for example coded in DPCM for boustrophedon scanning).

As indicated above, the estimation step is intended to determine first and second sets of prediction parameters that are used subsequently (during the entropic coding step) to predict the values of the esperance (or mean) μ and the width σ of a Laplace function (or distribution) representing the probability density of a quantified wavelet coefficient allowing for the value assumed by the quantified wavelet coefficient of either or both of its North and West neighbors.

The esperance μ and the width σ are defined relative to the prediction parameters of the first and second sets. For example, each set includes three prediction parameters θ (first), α (second) and β (third), and the equations linking those parameters to the esperance μ and the width σ take the following forms:

$$\mu = \theta \cdot C' \quad (1)$$

$$\sigma = \alpha + \beta \cdot C' \quad (2)$$

where, as indicated above, c' designates the context representing either the North neighbor wavelet coefficient W[n,m−1] of c (or W[n,m]) or the West neighbor wavelet coefficient W[n−1,m] of c.

In fact, as will emerge hereinafter, two esperance and width predictions are used, according to the neighbor concerned (North or East): a North prediction relates to the North esperance $\mu_N$ and the North width $\sigma_N$ and a West prediction relates to the West esperance $\mu_W$ and the West width $\sigma_W$. The first set is then associated with the North prediction and includes the parameters $\theta_N$, $\alpha_N$ and $\beta_N$, whereas the second set is associated with the West prediction and includes the parameters $\theta_W$, $\alpha_W$ and $\beta_W$.

The above equations (1) and (2), which are given by way of example, define computing rules for a simple way to estimate the (North and West) parameters $\theta$, $\alpha$ and $\beta$ using regression.

The first step preferably estimates $\theta_N$ and $\theta_W$ by means of a first regression, which entails solving an equation of the type:

$$c_{n+1} = \theta \cdot c$$

The first parameter $\theta$ for each set (North or West) is then obtained, for example using the least squares method:

$$\theta = \frac{\sum_n c_n c_{n+1}}{\sum_n c_n^2}$$

The above equation can be rewritten as follows, for the North and West sets:

$$\theta_N = \frac{Cov_N}{Var}$$

$$\theta_W = \frac{Cov_W}{Var}$$

where $Cov_N$, $Cov_W$ and $Var$ are respectively the North and West covariances and the non-normalized variance given by the following equations:

$$Var = \sum_{n,m} W[n,m]^2$$

$$Cov_N = \sum_{n,m} W[n,m] W[n, m-1]$$

$$Cov_W = \sum_{n,m} W[n,m] W[n-1, m]$$

A second regression is then used to estimate North prediction parameters $\alpha_N$ and $\beta_N$. This is achieved by solving a first system of equations of the type:

$$|W[n,m] - \theta_N \cdot W[n,m-1]| = \alpha_N + \beta_N |W[n,m-1]| \quad (3)$$

By then imposing the following definitions:

$$M_{11} = \sum_{n,m} 1 \quad (4)$$

$$M_{12} = M_{21} = \sum_{n,m} |W[n, m-1]| \quad (5)$$

$$M_{22} = \sum_{n,m} |W[n, m-1]|^2 \quad (6)$$

$$Y_1 = \sum_{n,m} |W[n,m] - \theta_N W[n, m-1]| \quad (7)$$

$$Y_2 = \sum_{n,m} |(W[n,m] - \theta_N W[n, m-1]) W[n, m-1]| \quad (8)$$

the prediction parameters $\alpha_N$ and $\beta_N$ are obtained by solving the system:

$$\begin{pmatrix} M_{11} & M_{12} \\ M_{21} & M_{22} \end{pmatrix} \begin{pmatrix} \alpha_N \\ \beta_N \end{pmatrix} = \begin{pmatrix} Y_1 \\ Y_2 \end{pmatrix} \quad (9)$$

The West prediction parameters $\alpha_W$ and $\beta_W$ are computed in the same way, by solving a second system of equations of the type:

$$|W[n,m] - \theta_W \cdot W[n-1,m]| = \alpha_W + \beta_W |W[n-1,m]| \quad (10)$$

This amounts to solving the system defined by equation (9) using coefficients defined by equations (4) to (8) in which $\theta_N$ is replaced by $\theta_W$, $W[n,m-1]$ is replaced by $W[n-1,m]$, $\alpha_N$ is replaced by $\alpha_W$ and $\beta_N$ is replaced by $\beta_W$.

Once the North prediction parameters ($\theta_N$, $\alpha_N$ and $\beta_N$) and the West prediction parameters ($\theta_W$, $\alpha_W$ and $\beta_W$) of each wavelet coefficient $W_{j,k}[n,m]$ of a sub-band $W_{j,k}$ have been determined, the next step is the quantifying step.

The quantifying step being entirely conventional, it will not be described here. For example, it may be implemented using a standard scalar quantifier of the type $$Q(W[n,m]) = \left\lfloor \frac{W[n,m]}{T} \right\rfloor$$

where T is the width of the quantifying increment.

The quantifying step consists in quantifying the wavelet coefficients $W_{j,k}[n,m]$ of each sub-band $W_{j,k}$ starting from a quantifying increment T that is either fixed or determined by a scheduling module.

Given the nature of the compression methods, the output bit rate (of the compressor) is directly proportional to the entropy of the input signal (i.e. the digital image data to be compressed). Now, the quantity of information to be transmitted generally varies over time because the characteristics of the input signal themselves vary with time. Consequently, with the aim of optimizing the use of the transmission channel, bit rate fluctuations at the output of the compressor are minimized by applying bit rate regulation. This is in fact indispensable if the transmission channel necessitates a constant throughput.

To enable this kind of real time bit rate regulation, it is imperative to use fast bit rate scheduling algorithms (which are exempt from constrained optimization and iterations) so as not to slow down the acquisition of the images as the satellite moves or, in the context of video coding, not to generate any jerky effect.

Two types of bit rate scheduling have been proposed for this purpose: scheduling with bit rate assignment and pure bit rate scheduling.

Scheduling with bit rate assignment allows the scheduling module to select the quantifying increments of the various sub-bands independently so that the total bit rate is equal to a bit rate set point and to select how that bit rate is distributed between the various sub-bands.

Pure bit rate scheduling links the quantifying increments of the various sub-bands (they are generally identical). In this case, the scheduling module merely selects, for all the sub-bands, the single quantifying increment that enables a fixed bit rate set point to be achieved.

Furthermore, to loosen the fixed bit rate constraint, compression (and therefore decompression) quality may be controlled to impose a constant image quality at the output of the compressor as the satellite moves or as images arrive for video coding.

To this end, there has been proposed a quality scheduling method consisting in determining a uniform quantifying increment T enabling a particular coding quality (generally fixed and in dB) to be obtained. The method consists in first computing the total distortion D corresponding to a given quantifying increment T and then using a true/false technique to determine the quantifying increment T enabling a given distortion set point D to be reached.

To be more precise, there are three main types of bit rate assignment or quality control method.

A first type covers methods that achieve constrained optimization by minimizing a Lagrange function of the form J=D+λR (where D is the distortion and R is the bit rate), with the constraint R=Ro (where Ro is a set point bit rate).

A second type covers methods based on modeling the compression system to establish a rule that links the bit rate R to the overall quantifying increment T or the distortion D to the bit rate R.

However, these two methods may not be used if it is necessary to work with non-uniform decompositions, for example during re-decomposition of sub-bands to take account of the modulation transfer function (MTF) with a view to deconvolution or assignment by sub-bands in the case of multicomponent images.

A third type covers methods based on modeling the compression system to establish a rule that links the bit rate R to the local quantifying increment T in each of the sub-bands or the distortion D to the bit rate R. A method of this type, adapted to bit rate assignment sub-band by sub-band using a first order arithmetic coder, is described in the document FR 02/05724 in particular.

Another object of the invention is to improve the result achieved by the compressor (or coder) described in the document cited above by establishing an optimum rule for scheduling the bit rate or the image quality of a wavelet transform compressor through the coding gain generated by taking account of the interdependencies of the intraband wavelet coefficients.

To achieve this, it is necessary first to model the behavior of a sub-band in terms of bit rate R and distortion D as a function of the estimated prediction parameters θ, α and β of the conditional Laplace function determined during the estimation step described above.

To effect this modeling it is possible to use simultaneously, for each sub-band, the two directions North-South and West-East, or in other words the first set of prediction parameters ($\theta_N$, $\alpha_N$, $\beta_N$) and the second set of prediction parameters ($\theta_W$, $\alpha_W$, $\beta_W$). However, this would impose mapping a large function, and it may further be demonstrated that coding a wavelet coefficient knowing only one (North or West) neighbor non-quantified wavelet coefficient yields a coding result similar to coding using the unquantified wavelet coefficients of the North and West neighbors. Consequently, the situation discussed hereinafter is one which uses only one (North or West) neighbor unquantified wavelet coefficient.

In this "monodirectional" situation, a Markov dependency chain may be defined by the following equation:

$$p(X_n | X_{n-1}) = \frac{1}{2(\alpha + \beta|X_{n-1}|)} e^{-|X_n - \theta X_{n-1}|/(\alpha + \beta|X_{n-1}|)}$$

It can then be shown that if, for a set of given prediction parameters θ, α and β, the esperance and the variance of the random variable $X_n$ remain good when n increases, then the series of random variables is ergodic.

A Monte-Carlo method may be used to compute the bit rate R and the distortion D of a series of this kind for a given quantifying increment T, consisting in drawing a sequence from the Markov chain and then estimating the esperances of the bit rate R and the distortion D for each symbol by averaging over consecutive terms of the sequence.

The calculated bit rate R and distortion D are meaningful if the Markov chain is ergodic and in particular as soon as its width (or variance) is bounded.

Drawing from the Markov chain may be effected in the following manner: Firstly, $X_{n+1}$ is computed recursively as a function of $X_n$ using a formula of the type:

$$X_{n+1} = S_n(\alpha + \beta|X_n|)\log U_n + \theta X_n$$

which $S_n$ and $U_n$ are independent random variables, each $S_n$ having the values +1 and −1 with respective probabilities ½ and ½ and $U_n$ having an uniform density over the range [0,1].

Bit rate and distortion curves must then be estimated. To this end, the first step is to estimate the relations between the quantifying increment T, the bit rate R and the distortion D for a pertinent range of prediction parameters θ, α and β.

By definition, the range of pertinent values is that for which the Markov chain is ergodic. Note that the ergodicity does not depend on the prediction parameter α, which is a scaling parameter. If a string of random variables $X_n$ is a Markov chain for the prediction parameters θ, α and β, then the string $\lambda X_n$ is a Markov chain for the parameters θ, λα and β. The discussion may therefore be limited to the situation where α=1.

Moreover, since β cannot be negative, it is natural to limit the value of β to the range [0,1]. If β is greater than 1, it is likely that the variance of the associated distribution will tend toward infinity (by progressive spreading). Similarly, θ must have an absolute value less than 1, without which the process would risk having a random step behavior which is not ergodic. On the other hand, the domain of the legal prediction parameters θ (the other prediction parameters being fixed) is necessarily symmetrical, since if a series $X_n$ is of parameters θ, α and β, the series $(-1)^n X_n$ is of parameters −θ, α and β. Analogous reasoning shows that the domain in question is a range in the form ]−$\theta_0$, $\theta_0$[.

Failing the ability to define clearly using analytical methods a domain of the pairs (β, θ) for which the Markov chain is ergodic, a subset thereof is defined for which the estimated width of the random variable $E(|X_n|)$ is bounded by a fixed limit.

When the map is drawn of the random variable $E(X_n)$ as a function of the prediction parameters β and θ, it is found that the estimation of an esperance becomes more and more costly (in terms of the number of iterations) on approaching non-ergodicity. Moreover, by plotting sections of this function of two variables and its inverse, it is found that its inverse is substantially linear in β:

$$E(X_n) = \frac{1}{A(\theta) - B(\theta)\beta}$$

where A and B are functions with positive values.

Consequently, for each section of this two-variable function, at constant θ, the slope and the ordinate at the origin may be estimated by a very stable regression. For example, the parameters of the functions $A(\theta)$ and $B(\theta)$ may be set by decomposition in a Deslauriers-Dubuc base. It is then possible to estimate overall ergodicity limits with great accuracy.

The settings of the parameters of the functions $A(\theta)$ and $B(\theta)$ in the vicinity of one (1) are more accurate if the functions $A(\theta)^2$ and $B(\theta)^2$ are decomposed in a Deslauriers-Dubuc base instead of the functions $A(\theta)$ and $B(\theta)$. The graphs of these functions appear to show that they have a zero of the form $(1-\theta)^{1/2}$ in one (1) for A, and a value $\theta>1$ for B. The given decomposition in the Deslauriers-Dubuc base of each function has a cost of nine coefficients.

The bit rate function $R(\theta, \alpha, \beta, T)$ of a sub-band may be defined as a function of the prediction parameters $\theta$, $\alpha$ and $\beta$ and the quantifying increment T by the following equation:

$$R(\theta, \alpha, \beta, T) = E(-P(Q(X_n)|X_{n-1})\log_2 P(Q(X_n)|X_{n-1}))$$

in which $X_n$ is a Laplace Markov chain of parameters $\theta$, $\alpha$ and $\beta$ and Q is a quantifier of the step T.

The bit rate R may be estimated by Monte-Carlo mean values calculated on drawings from the Markov chain, and therefore by averaging the series $R_n = -P_n \log_2 P_n$, in which:

$$P_n = \frac{1}{2}\int Q(x) = Q(X_n) \frac{1}{\alpha + \beta|X_{n-1}|} e^{-|x - \theta X_{n-1}|/(\alpha + \beta|X_{n-1}|)} dx$$

Those mean values may be estimated for prediction parameters $\theta$ and $\beta$ that are in the ergodicity domain identified above. The homogeneous nature of the bit rate function R may be used to reduce the dimensionality of the problem, as $R(\theta, \alpha, \beta, T) = R(\theta, 1, \beta, T/\alpha)$.

The distortion function $D(\theta, \alpha, \beta, T)$ of the Markov chain, which will be used to model the distortion D of a sub-band quantified as a function of the prediction parameters $\theta$, $\alpha$ and $\beta$ and the quantifying increment T, may be defined by the following equation:

$$D(\theta, \alpha, \beta, T) = E(|Q(X_n) - X_n|^2)$$

in which $X_n$ is again the Laplace Markov chain of parameters $\theta$, $\alpha$ and $\beta$, and Q is again a quantifier with an increment T.

Once again, the distortion D may be estimated from Monte-Carlo mean values for the series $D_n = |X_n - Q(X_n)|$. The stationary distribution associated with the Markov chain must be known. As there is no explicit expression for it, a Monte-Carlo method must be used.

Once again, homogeneity reduces the dimension of the problem:

$$D(\theta, \alpha, \beta, T) = \alpha^2 D(\theta, 1, \beta, T/\alpha)$$

Given that the ergodicity domain contains only three singular points (or corners), triangular meshing of the ergodicity domain concerned may be used, and triangular spline functions may be used to represent the distortion function D and the bit rate function R over that ergodicity domain. However, it can be shown that the top corner of the domain is a point at which the functions D and R may vary greatly, and that it is preferable to use a finer mesh around this point, for example a square mesh projected into the ergodicity domain.

For $\theta$, $\beta$ in the meshed ergodicity domain, $\alpha=1$ and the variable T (quantifying increment) varying from $10^{-3}$ to 1000, the distortion D and the bit rate R may be estimated by a Monte-Carlo method over large series of drawings (typically a few million). This produces a map of D and R over an ergodicity domain that covers a very wide range of parameters.

The inverse function (which associates a quantifying increment T with a bit rate R) can then be computed and decomposed in a Deslauriers-Dubuc base by inverting the application $\theta, \beta, T \rightarrow R$ into $\theta, \beta, R \rightarrow T$.

In order to represent the function T(R) faithfully in the regions in which it varies very suddenly, this inversion must take account of parameter settings in R that are either linear or logarithmic.

The relations between the bit rate R, the quantifying increment T and the distortion D can then be predicted for a given sub-band.

As indicated above, a wavelet coefficient for each sub-band is preferably predicted with the aid of two neighbor (North and West) wavelet coefficients, whereas the bit rate model R and the distortion model D described above use only a context with only one neighbor wavelet coefficient.

To associate a mono-dimensional model with a sub-band, it is then necessary to reduce the pair of first and second sets of prediction parameters associated with two marginal Laplace functions to a single set. The reduction used for bit rate scheduling is, for example:

$$\alpha = \sqrt{\alpha_N \alpha_W}$$

$$\beta = \frac{\beta_N + \beta_W}{2\sqrt{2}}$$

$$\theta = \frac{|\theta_N| + |\theta_W|}{2}$$

This reduction may be regarded as arithmetic or geometric averaging. Only $\beta$ is then further contracted by a factor $\sqrt{2}$, deemed to model the reduction of uncertainty linked to the use of a double context.

The choice of the factor $\sqrt{2}$ can be justified by a simple Bayesian approach: two measurements, affected by the combined noise from two noises that are independent, can be combined (by averaging) by reducing the standard deviation of the measurement noise by a factor $\sqrt{2}$. The choice of this convention is certainly arbitrary, but it yields reasonable prediction results for standard images. Other choices for refining the reduction may of course be envisaged.

In the light of the foregoing, it is now a simple matter to generate scheduling algorithms.

Accordingly, in the case of pure bit rate scheduling, consisting in determining a uniform quantifying increment T yielding a global set point bit rate for an image, it suffices to compute, for each sub-band, a bit rate prediction as a function of a quantifying increment T, and thus a total bit rate R. To this end, the true/false technique is used to determine the value of the quantifying increment T that renders the bit rate R corresponding to T equal to the bit rate set point.

In the case of scheduling by bit rate assignment, the aim is to determine a quantifying increment T freely for each sub-band in order to minimize the distortion D for a global bit rate set point R. To this end, the total bit rate R is divided into small sections and those sections are distributed iteratively between the various sub-bands, each time assigning a section to the sub-band that reduces the global distortion D the most. As indicated above, one embodiment of this method is described in the document FR 02/05 724.

In the case of quality scheduling, the aim is to determine a uniform quantifying increment T yielding a given quality of coding (fixed, in dB). To this end, the total distortion D that corresponds to a given quantifying increment T is computed, after which a true/false technique is used to determine the quantifying increment T that yields the given distortion set point D.

At the end of the quantifying increment, with or without scheduling, the set of quantified wavelet coefficients $Q(W_{j,k}[n,m])$ for a given sub-band $W_{j,k}$ is available.

The next step is a contextual entropic coding step, which is divided into two phases, one dedicated to predicting esperances $\mu$ and widths $\sigma$ from, in particular, first and second sets of prediction parameters determined during the estimation step, and the other dedicated to entropic coding as such.

The method of predicting the esperance $\mu$ and the width $\sigma$ associated with a quantified wavelet coefficient depends on its context, in other words on any neighbor wavelet coefficients. Four situations may be encountered.

In the absence of North neighbor wavelet coefficients ($W[n,m-1]$), i.e. if the wavelet coefficient ($W[n,1]$) belongs to the first row of the sub-band concerned, the esperance $\mu$ and width a prediction values of the Laplace function (P) are made identical to the West esperance prediction value $\mu_W$ and the West width prediction value $\sigma_W$, i.e. $\mu=\mu_W$ and $\sigma=\sigma_W$.

In the absence of West neighbor wavelet coefficients ($W[n-1,m]$), i.e. if the wavelet coefficient ($W[1,m]$) belongs to the first column of the sub-band concerned, the esperance $\mu$ and width a prediction values of the Laplace function (P) are made identical to the North esperance $\mu_N$ and the North width $\mu_N$ prediction values, i.e. $\mu=\mu_N$ and $\sigma=\sigma_N$.

In the absence of West neighbor wavelet coefficients ($W[n-1,m]$) and North wavelet coefficients ($W[n,m-1]$), i.e. if the wavelet coefficient ($W[1,1]$) belongs to the first row and the first column of the sub-band concerned, fixed Laplace-coding is effected, i.e. zero order Laplace coding based on taking into account an unconditional probability density.

Finally, in the presence of West and North neighbor wavelet coefficients, the esperance $\mu$ and width a prediction values of the Laplace function (P) are respectively made identical to the half-sum of the North $\mu_N$ and West $\mu_W$ esperance prediction values and the half-sum of the North width $\sigma_N$ and West width $\sigma_W$ prediction values, i.e. $\mu=[(\mu_N+\mu_W)/2]$ and $\sigma=[(\sigma_N+\sigma_W)/2]$.

The values of $\mu_N$, $\mu_W$, $\sigma_N$ and $\sigma_W$ are determined from equations (1) and (2), which are referred to again hereinafter for the North and West predictions:

$$\mu_N=\theta_N\cdot Q(W[n,m-1]) \quad (1a)$$

$$\mu_W=\theta_W\cdot Q(W[n-1,m]) \quad (1b)$$

$$\sigma_N=\alpha_N+\beta_N\cdot|Q(W[n,m-1])| \quad (2a)$$

$$\sigma_W=\alpha_W+\beta_W\cdot|Q(W[n-1,m])| \quad (2b)$$

where $Q(W[n,m-1])$ and $Q(W[n-1,m])$ are the quantified wavelet coefficients of the North and West neighbors of a quantified wavelet coefficient $Q(W[n,m])$.

It is important to note that the computation of the width $\sigma$ is generally skewed if the value of the associated quantified wavelet coefficient $Q(W[n,m-1])$ or $Q(W[n-1,m])$ is a null value.

In this case, noting that $Q(W[n,m])$ represents the esperance $E(W[n,m]|Q(W[n,m]))$ of $W[n,m]$ knowing its quantified value, the following relation may be deduced there from when $Q(W[n,m])=0$:

$$E(|W[n,m]||Q(W[n,m]))=T/2\neq|Q(W[n,m])|$$

where T is the quantifying increment selected in the quantifying step by the quantifier (assumed here to be of the "double 0 box" type).

Starting from the above deduction, when they have null values, $Q(W[n,m-1])$ and $Q(W[n-1,m])$ may be replaced in equations (1a), (1b), (2a) and (2b) by a selected constant $\xi T$ where $\xi$ is a constant strictly greater than zero and less than or equal to 1. A value of $\xi$ equal to ½ is in theory the optimum value, but in the case of high-resolution quantifying and Laplace functions that are very steep in the 0 box, it is preferable to select $\xi$ equal to ⅓.

Once in possession of the esperance $\mu$ and the width $\sigma$ associated with each quantified wavelet coefficient of a sub-band, the entropic coding phase may be commenced.

To this end, it suffices to discretize a Laplace function that is not necessarily centered in the 0 box of the quantifier. Discretization consists here in sampling the continuous Laplace function.

Decompressing digital image data compressed by means of the compression method just described consists in performing the four steps of that method in the reverse order. Consequently, the decompression method will not be described hereinafter.

The invention relates equally to a device for compressing (or coding) digital image data using wavelet transforms. This device being adapted to implement the compression method described above, only its functional modules are described hereinafter, with reference to FIG. 1.

Figure 1:
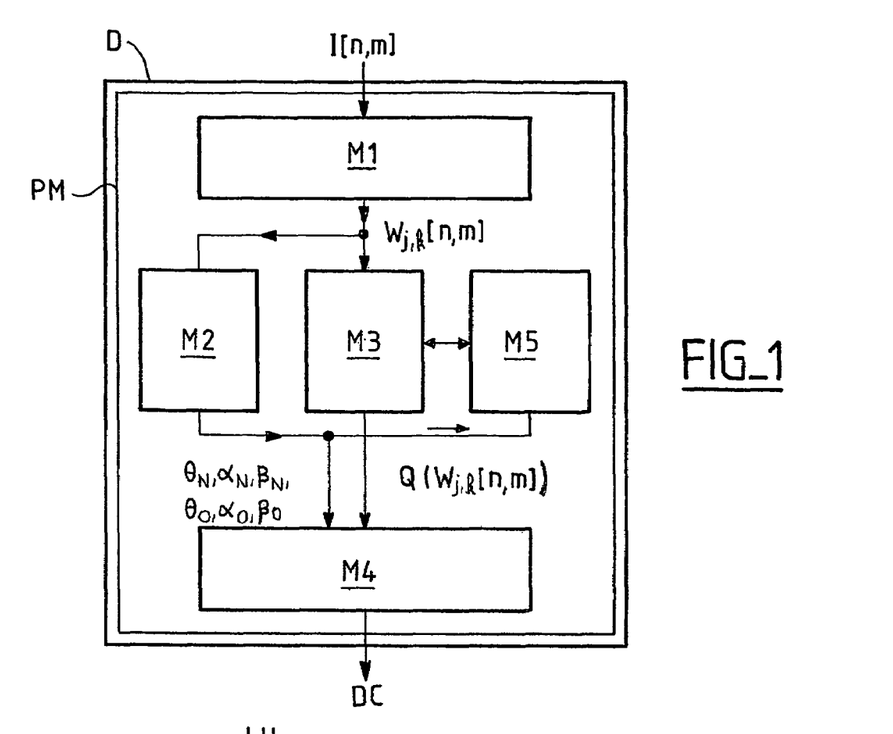
FIG. 1 is a functional block diagram of a digital image data compressor of the invention.

The compressor D of the invention comprises a processing module PM that may be divided into at least four modules.

Figure 2:
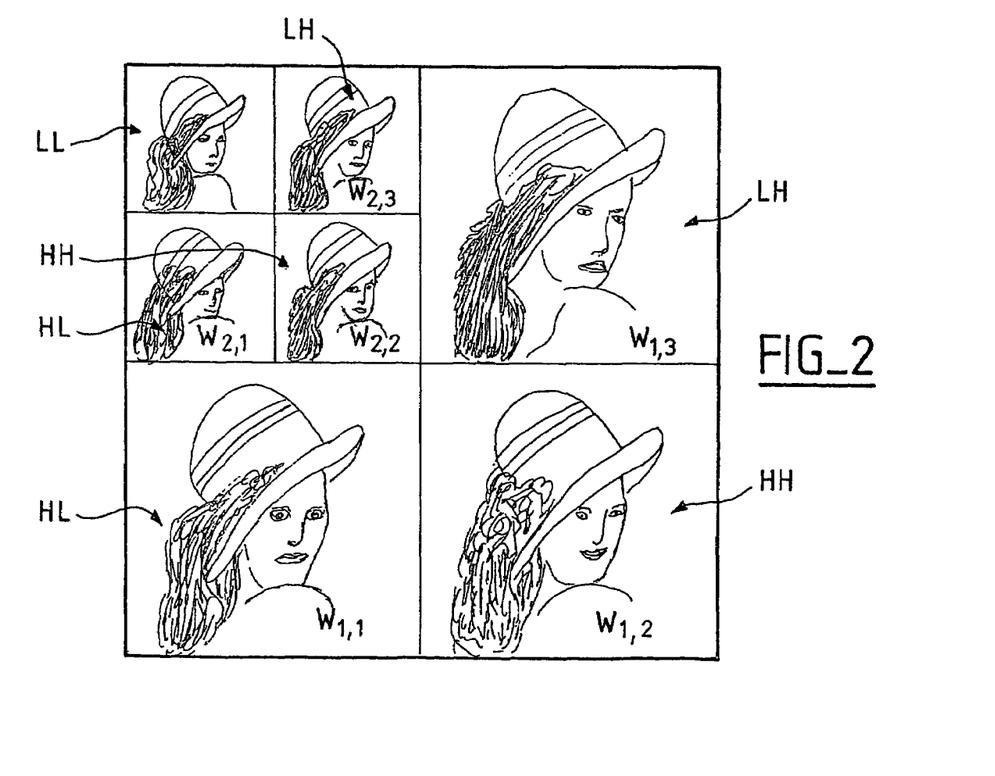
FIG. 2 shows the decomposition of an image into sub-bands with different levels of resolution.

A first module M1 is supplied with digital image data I[n,m] defining images I and decomposes each image I into wavelets. In this transformation into sub-bands $W_{j,k}$ (denoted LH, HL, HH and LL, as indicated in FIG. 2) and over a plurality of resolution levels j, each sub-band is represented by an array [n,m] of wavelet coefficients $W_{j,k}[n,m]$. This is a standard module, perfectly familiar to the person skilled in the art, for example using the Daubechies/Antonini 7-9 bi-orthogonal wavelet transform.

A second module M2 is fed with wavelet coefficients $W_{j,k}[n,m]$ by the first module M1 and estimates, for each wavelet coefficient $W_{j,k}[n,m]$ of each sub-band of wavelets $W_{j,k}$ of an image I, first ($\theta_N$, $\alpha_N$ and $\beta_N$) and second ($\theta_W$, $\alpha_W$ and $\beta_W$) sets of prediction parameters respectively associated with North-South and West-East directions, as a function of the values of the wavelet coefficients of its North neighbor $W_{j,k}[n,m-1]$ or West neighbor $W_{j,k}[n-1,m]$. To this end, the second module M2 uses the double regression estimation technique described above, for example.

A third module M3 is supplied with wavelet coefficients $W_{j,k}[n,m]$ by the first module M1 and quantifies them to deliver quantified wavelet coefficients $Q(W_{j,k}[n,m])$. It is therefore a conventional scalar quantifier module (or quantifier) and perfectly familiar to the person skilled in the art.

A fourth module M4 is supplied with quantified wavelet coefficients $Q(W_{j,k}[n,m])$ by the third module M3 and with first and second sets of prediction parameters ($\theta$, $\alpha$ and $\beta$) by the second module M2. It codes the quantified wavelet coefficients $Q(W_{j,k}[n,m])$ entropically and contextually on the basis of the values of the North prediction parameters ($\theta_N$, $\alpha_N$ and $\beta_N$) and the West prediction parameters ($\theta_W$, $\alpha_W$ and $\beta_W$) of the first and second sets.

To be more precise, the fourth module M4 determines, for each quantified wavelet coefficient $Q(W_{j,k}[n,m])$, the esperance $\mu$ and width $\sigma$ prediction values of the associated Laplace function P, taking account of the values of the quantified wavelet coefficients $W_{j,k}[n,m-1]$ of its North neighbor and/or $W_{j,k}[n-1,m]$ of its West neighbor and of the associated North prediction parameters ($\theta_N$, $\alpha_N$ and $\beta_N$) and West prediction parameters ($\theta_W$, $\alpha_W$ and $\beta_W$), and then entropically codes each quantified wavelet coefficient $Q(W_{j,k}[n,m])$ taking account of the esperance µ and width a prediction values that it has determined. To this end, the fourth module M4 uses the contextual entropic determination, prediction and coding techniques described above.

Once entropic coding is completed, the fourth module M4 supplies compressed digital image data DC at its output.

The compressor D may also include a fifth module M5 for bit rate scheduling and/or bit rate assignment at the sub-band level and/or for quality scheduling, preferably by the scheduling method described above. This fifth module M5 is connected to the second module M2, which supplies it with a first set of prediction parameters ($\theta_N$, $\alpha_N$ and $\beta_N$) and a second set of prediction parameters ($\theta_W$, $\alpha_W$ and $\beta_W$), and to the third module M3.

The invention also relates to a decompressor (or decoder) device using the decompression method cited above. The decompressor will not be described hereinafter in that it is substantially made up of the same functional modules as the compressor D but functioning in a reverse manner (the coder module here being supplied with compressed digital image data and the transformation module supplying at its output decompressed digital image data defining the original image).

The invention also relates to a compressor/decompressor (or coder/decoder (codec)) comprising a compressor and a decompressor of the invention.

The invention provides a coding method that is particularly effective, achieving a significant improvement in coding through exploiting mutual information conjointly with conditional Laplace modeling.

Moreover, its prediction parameter estimation and prediction determination techniques, which are particularly simple in terms of computation, simplify the structures of the coder and the decoder.

Moreover, local assignment is possible because there is a different quantifier for each of the sub-bands.

Finally, because the assignment rule takes explicit account of the characteristics of the first order entropic coder of the invention, said compressor is much more efficient than the prior art devices, in particular for real time applications with high input bit rates (large images), especially in the space field. Its efficiency is further increased by the small number of operations required for coding.

The invention is not limited to the compression method, decompression method, compressor, decompressor and codec described above by way of example only, and encompasses all variants that the person skilled in the art might envisage that fall within the scope of the following claims.

The invention claimed is:

1. Wavelet transform method, implemented by a device including an image-data processor, of compressing digital image data, comprising a step of transforming digital image data into initial wavelet coefficients divided into sub-bands, a step of quantifying said wavelet coefficients, and a step of entropically coding said quantified wavelet coefficients, the steps of transforming, quantifying and entropically coding performed by the processor, characterized in that the method comprises, between the transformation and quantifying steps, a step performed by the processor of estimating, for each initial coefficient of each sub-band of the image, first and second sets of prediction parameters respectively associated with "North-South" and "West-East" directions as a function of the values of the initial wavelet coefficients of its North and West neighbors, and, in the entropic coding step, there is determined for each initial coefficient of each sub-band of the image a prediction of the esperance and the width of a Laplace type function representing its probability density as a function of said first and/or second sets of prediction parameters and the quantified wavelet coefficients of its North neighbor or its West neighbor, said initial wavelet coefficients having initial values, said initial wavelet coefficients are coded entropically using the associated esperances and widths that transform the initial coefficient values into different wavelet coefficient values based on the entropic coding using the associated esperances and widths.

2. Method according to claim 1, characterized in that, in the entropic coding step, when it is possible, North and West esperance predictions and North and West width predictions are determined for the Laplace function of each quantified wavelet coefficient, said North, respectively West, esperance prediction being defined by the product of a first prediction parameter of the first, respectively second, set and the value of said North, respectively West, neighbor quantified wavelet coefficient and said North, respectively West, width prediction, being defined by the sum of a second prediction parameter of the first, respectively second, set and the product of a third prediction parameter of the first, respectively second, set and the absolute value of said North, respectively West, neighbor quantified wavelength coefficient.

3. Method according to claim 2, characterized in that in the entropic coding step, firstly, in the absence of a North neighbor coefficient, the esperance and width predictions of the Laplace function are made identical to the West esperance and West width predictions; secondly, in the absence of a West neighbor coefficient, the esperance and width predictions of the Laplace function are made identical to the North esperance and North width predictions; thirdly, in the absence of West and North neighbor coefficients, fixed Laplace coding is effected; fourthly, in the presence of West and North neighbor coefficients, the esperance and width predictions of the Laplace function are respectively made identical to the half-sum of the North and West esperance predictions and to the half-sum of the North and West width predictions.

4. Method according to claim 1, characterized in that the prediction parameters of said first and second sets are estimated by regression.

5. Method according to claim 2, characterized in that the prediction parameters of said first and second sets are estimated by regression and further characterized in that said first prediction parameters of the first and second sets are estimated by a first regression obtained by solving a first equation $W[n+1,m]=\theta \cdot W[n,m]$ where $W[n,m]$ is the value of a wavelet coefficient and $W[n+1,m]$ is the value of the neighbor wavelet coefficient $W[n,m]$, and $\theta$ is a first prediction parameter.

6. Method according to claim 5, characterized in that said first equation is solved by the least squares method, said first prediction parameter of a first or second set being equal to the ratio between the non-normalized covariance and variance of the values of the wavelet coefficients associated with the first or second set.

7. Method according to claim 2 characterized in that the prediction parameters of said first and second sets are estimated by regression, and further characterized in that said second and third prediction parameters of the first set are estimated by a second regression obtained by solving a first system of equations $|W[n,m]-\theta_N \cdot W[n,m-1]|=\alpha_N+\beta_N|W[n,m-1]|$, where $W[n,m]$ is the value of a wavelet coefficient, $W_{n,m-1}$ is the value of the North neighbor wavelet coefficient of $W_{n,m}$, and $\theta_N, \alpha_N$ and $\beta_N$ are respectively first, second and third prediction parameters of the first set, and said second and third prediction parameters of the second set are estimated by a second regression obtained by solving a second system of equations $|W[n,m]-\theta_W \cdot W[n-1,m]|=\alpha_W+\beta_W|W$

[n−1,m]|, where $W_{n-1,m}$ is the value of the West neighbor wavelet coefficient of $W_{n,m}$ and $\theta_W$, $\alpha_W$ and $\beta_W$ are respectively first, second and third prediction parameters of the second set.

8. Method according to claim 7, characterized in that said first and second systems of equations are solved by the least squares method.

9. Method according to claim 1, characterized in that a neighbor quantified wavelet coefficient of null value is replaced by a product of the quantifying increment used during the quantifying step and a selected constant strictly greater than zero and less than or equal to one (1).

10. Method according to claim 9, characterized in that said constant is made equal to ⅓.

11. Method according to claim 1, characterized in that, in the entropic coding step, after predicting said esperance and said width, the Laplace function is discretized.

12. Method according to claim 1, characterized in that, in the entropic coding step, said iterative coding follows predicting said esperance and said width.

13. An image data compressor device (D) for compressing digital image data by wavelet transformation, comprising an image-data processing means (PM) having a module (M1) that transforms digital image data into wavelet coefficients distributed in sub-bands, a module (M3) that quantifies wavelet coefficients, and a module (M4) that entropically codes the quantified wavelet coefficients, characterized in that said processing means (PM) further comprise an estimator module (M2) adapted to estimate for each coefficient of each sub-band of the image first and second sets of prediction parameters respectively associated with "North-South" and "West-East"directions as a function of the values of the wavelet coefficients of its North and West neighbors and said entropic coder module (M4) is adapted to determine for each coefficient of each sub-band of the image prediction values of the esperance and the width of a Laplace-type function representative of its probability density as a function of said first and/or second set of prediction parameters and of the quantified wavelet coefficient of its North neighbor or its West neighbor and to code said quantified wavelet coefficients entropically using said determined associated esperances and widths.

14. Device according to claim 13, characterized in that, when it is possible, said entropic coder module (M4) determines for the Laplace function of each quantified wavelet coefficient North and West esperance prediction values and North and West width prediction values, said North, respectively West, esperance prediction value being defined by the product of a first prediction parameter of the first, respectively second, set and the value of said North, respectively West, neighbor quantified wavelet coefficient, and said North, respectively West, width prediction value, being defined by the sum of a second prediction parameter of the first, respectively second, set and the product of a third prediction parameter of the first, respectively second, set and the absolute value of said North, respectively West, neighbor quantified wavelet coefficient.

15. Device according to claim 14, characterized in that said entropic coder module (M4), in the absence of a North neighbor coefficient, makes the esperance and width prediction values of the Laplace function identical to the West esperance and West width prediction values, in the absence of a West neighbor coefficient, makes the esperance and width prediction values of the Laplace function equal to the North esperance and North width prediction values, in the absence of West and North neighbor coefficients, effects fixed Laplace coding, and, in the presence of West and North neighbor coefficients, makes the esperance and width prediction values of the Laplace function respectively equal to the half-sum of the North and West esperance prediction values and to the half-sum of the North and West width prediction values.

16. Device according to claim 13, characterized in that said estimator module (M2) estimates the prediction values of said first and second sets by regression.

17. Device according to claim 14, characterized in that said estimator module (M2) estimates the prediction values of said first and second sets by regression, and further characterized in that said estimator module (M2) estimates said first prediction parameters of the first and second sets by a first regression obtained by solving a first equation W[n+1,m]=θ·W[n,m] where W[n,m] is the value of a wavelet coefficient, W[n+1,m] is the value of the neighbor wavelet coefficient W[n,m], and θ is a first prediction parameter.

18. Device according to claim 17, characterized in that said estimator module (M2) solves said first equation by the least squares method, said first prediction parameter of a first or second set being equal to the ratio between the non-normalized covariance and variance of the values of the wavelet coefficients associated with the first or second set.

19. Device according to claim 14, characterized in that said estimator module (M2) estimates the prediction values of said first and second sets by regression, and further characterized in that said estimator module (M2) estimates said second and third prediction parameters of the first set by a second regression obtained by solving a first system of equations |W[n,m]−θ$_N$·W[n,m−1]|=α$_N$+β$_N$|W[n,m−1]|', where W[n,m] is the value of a wavelet coefficient, $W_{n,m-1}$ is the value of the North neighbor wavelet coefficient of $W_{n,m}$, and θ$_N$, α$_N$ and β$_N$ are respectively first, second and third prediction parameters of the first set, and estimates said second and third prediction parameters of the second set by a second regression obtained by solving a second system of equations |W[n,m]−θ$_W$·W[n−1,m]|=α$_W$+β$_W$|W[n−1,m]|, where $W_{n-1,m}$ is the value of the West neighbor wavelet coefficient of $W_{n,m}$, and θ$_W$, α$_W$ and β$_W$ are respectively first, second and third prediction parameters of the second set.

20. Device according to claim 19, characterized in that said estimator module (M2) solves said first and second systems of equations by the least squares method.

21. Device according to claim 13, characterized in that said entropic coding module (M4), in the presence of a neighbor quantified wavelet coefficient of null value, replaces it by a product of the quantifying increment used during the quantifying step and a selected constant strictly greater than zero and less than or equal to one (1).

22. Device according to claim 21, characterized in that said constant is made equal to ⅓.

23. Device according to claim 13, characterized in that said entropic coder module (M4), after predicting said esperance and said width, discretizes the Laplace function.

24. Device according to claim 13, characterized in that said entropic coding module (M4), after predicting said esperance and said width, proceeds to said iterative coding.

25. Method according to claim 1, characterized in that it enables real-time bit rate regulation by implementing a bit rate scheduling algorithm of the "with bit rate assignment-"type consisting in leaving a scheduling module to select independently the quantifying increments used during quantifying the various sub-bands so that the coder bit rate is equal to a bit rate set point and to select how the bit rate should be divided between the various sub-bands.

26. Method according to claim 1, characterized in that it enables real-time bit rate regulation by implementing a bit rate scheduling algorithm of the "with pure bit rate assignment" type consisting in linking the quantifying increments of the various sub-bands, which are generally identical, a scheduling module merely selecting the single quantifying increment for all the sub-bands that will enable a fixed set point bit rate to be achieved.

27. A computer-readable medium containing instructions implemented by a processor comprising:

computer-readable means for transforming digital image data into initial wavelet coefficients divided into sub-bands, computer-readable means for quantifying said wavelet coefficients, computer-readable means for entropically coding said quantified wavelet coefficients, computer-readable means for estimating, for each initial coefficient of each sub-band of the image, first and second sets of prediction parameters respectively associated with "North-South" and "West-East" directions as a function of the values of the initial wavelet coefficients of its North and West neighbors, said computer-readable means for entropically coding including determining for each initial coefficient of each sub-band of the image a prediction of the esperance and the width of a Laplace type function representing its probability density as a function of said first and/or second sets of prediction parameters and the quantified wavelet coefficients of its North neighbor or its West neighbor, said computer-readable means for entropically coding including entropically coding said initial wavelet coefficients using the associated esperances and widths that transform initial coefficient values into different wavelet coefficient values based on the entropic coding using the associated esperances and widths.

* * * * *